C. B. Clark,
Blind-Hinge.
No. 75,862.    Patented Mar. 24. 1868.
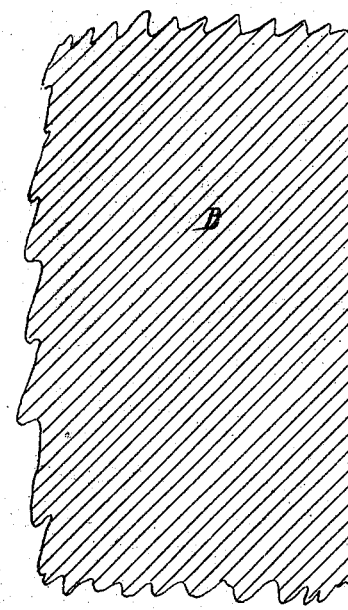
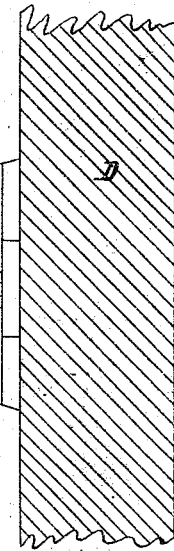
Fig. 1.
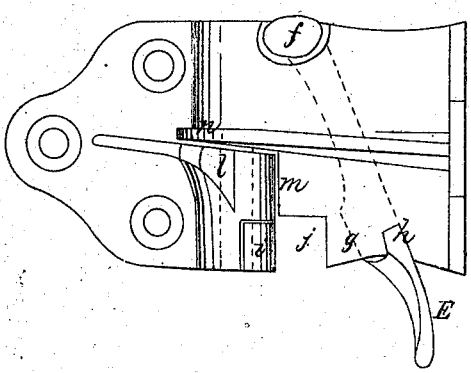
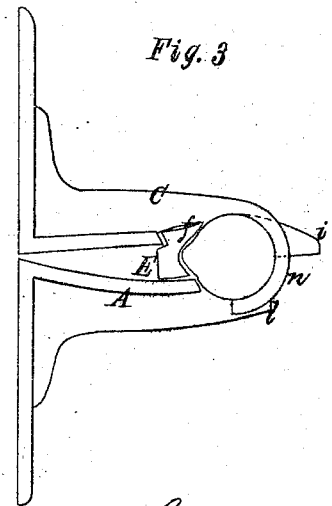
Fig. 4.   Fig. 2.   Fig. 3.
WITNESSES.
J. R. Drake
C. F. Langford
Chas. B. Clark.
by J. Fraser & Co.
Atty.

United States Patent Office.

CHARLES B. CLARK, OF BUFFALO, NEW YORK.

Letters Patent No. 75,862, dated March 24, 1868; antedated October 18, 1867.

---

IMPROVED BLIND-HINGE.

---

*The Schedule referred to in these Letters Patent and making part of the same.*

---

TO ALL WHOM IT MAY CONCERN:

Be it known that I, CHARLES B. CLARK, of the city of Buffalo, in the county of Erie, and State of New York, have invented a certain new and useful Improvement in Blind-Hinges; and I do hereby declare that the following is a full and exact description thereof, reference being had to the accompanying drawings, making part of this specification, in which—

Figure 1 is a view of my improved butt attached to a portion of the blind, which is represented as thrown open, showing, in elevation, the back or exterior faces of the former.

Figure 2 is a detached view, in elevation, of the butt, as it appears from the outside, when the blind is half open, except that the locking-bar is represented swung back, in order to better show the construction.

Figure 3, a plan of the same closed.

Figure 4, a perspective view of the locking-bar detached.

Like letters of reference designate corresponding parts in all the figures.

My invention relates to that class of blind-butts which are self-fastening by means of a gravitating-bar; and it consists in providing the knuckle of the male portion of the hinge with a flange, which fits in a corresponding recess formed in the contiguous edge of the wing of the female portion, and thereby prevents the separation of the parts after the blind has been hung; and also in providing the knuckle of the female portion with an upright shoulder, forming a stop, against which the edge of the wing of the other half strikes, arresting the motion of the blind after it has been swung open to the proper position, all as hereinafter particularly set forth.

In the drawings, A represents the female portion of the butt, attached to the window-frame B, C the male portion, attached to the blind, D, and E the gravitating locking-bar. A pin or axis, from the portion C, fits and turns with the latter in a hole in the fixed portion A, as shown in dotted lines.

The locking-bar E is constructed, as shown in fig. 4, with a boss, $f$, at its upper end, which rests in a notch in the upper edge of the wing $g$ of the portion C, and with a lip, $h$, which overlaps the lower edge of the wing, (figs. 1 and 2,) and prevents it being detached therefrom after the two parts of the hinge have been put together.

The knuckle of the stationary portion of the butt is provided with a cam-projection, $i$, (figs. 2 and 3,) while the contiguous portion of the wing $g$ is recessed, (shown at $j$,) to allow the wing to pass the cam in opening the shutter, when the bar E, by its gravity, falls between the cam and wing, and prevents the closing of the shutter, as represented in fig. 1. The blind is readily released by swinging the bar back, as shown in fig. 2, when the hinge is free to turn.

The first feature of my invention consists in forming the knuckle of the stationary part of the hinge with a shoulder or stop-face, $l$, against which the contiguous edge, $m$, of the movable portion strikes when the shutter has been swung open to a position parallel with the wall, arresting its further progress, and preventing any play or rattling between the locking-bar and cam $i$. In devices as ordinarily constructed, a stop is required to be affixed to the wall or blind, or the latter swings around till its edge rests against the wall in an inclined and unsightly position, there being, in such cases, sufficient play between the parts to produce a most disagreeable rattling. These objections it is evident that my improvement entirely overcomes.

Hitherto various devices have been employed, in connection with the hinge at the upper end of the blind, to prevent the removal of the blind by a separation of the parts of the hinge. As a substitute for these arrangements, which are objectionable, both on account of the extra expense, and the difficulty of attaching or detaching the shutter, owing to the height of the hinge, and the nice adjustment required to effect the required purpose, I provide the knuckle of the male portion C with a flange, $n$, concentric with the axis of the hinge, and extending partially around the knuckle, as shown in fig. 3. A corresponding notch or recess, $o$, is made in the adjacent edge of the wing $p$ of the stationary portion, in which this flange fits, and thereby, as is readily perceived, prevents a disconnection of the hinge so long as thus engaged. When the butt is closed, or nearly so, the flange is disengaged from the recess, which allows the easy separation or connection of its two portions, (fig. 3;) but, when the butt is attached to the blind and closed, the upper portion of the window-frame, in which the latter then fits, prevents its separation, and, when the blind is swung open sufficiently to clear the frame, the flange then becomes engaged in notch $o$, thus preventing the unhinging of the shutter in any position in which it can be placed, except at the point when the shutter clears the frame.

In addition to the advantages already enumerated, the shoulder or stop $l$ and abutting-portion $m$ not only prevent the rattling of the blind, and hold it in its proper position, but, by preventing that play or partial swinging back and forth, relieve the hinge of the great strain to which it would otherwise be subjected by the action of the wind.

What I claim as my invention, is—

A self-locking blind-butt, when provided with flange $n$, recess $o$, stop $l$, and abutting-portion $m$, constructed, arranged, and operating substantially in the manner and for the purposes set forth.

In witness whereof, I have hereunto signed my name in the presence of two subscribing witnesses.

C. B. CLARK.

Witnesses:
    JAY HYATT,
    ALBERT HAIGHT.